US012681317B2

(12) United States Patent
 Kobayashi

(10) Patent No.: US 12,681,317 B2
(45) Date of Patent: Jul. 14, 2026

(54) VIRTUAL IMAGE DISPLAY DEVICE

(71) Applicant: JVCKENWOOD Corporation, Yokohama (JP)

(72) Inventor: Manabu Kobayashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 251 days.

(21) Appl. No.: 18/659,208

(22) Filed: May 9, 2024

(65) Prior Publication Data

US 2024/0288702 A1     Aug. 29, 2024

Related U.S. Application Data

(63) Continuation of application No. PCT/JP2022/031758, filed on Aug. 23, 2022.

(30) Foreign Application Priority Data

Nov. 12, 2021    (JP) ................................. 2021-185082
Nov. 12, 2021    (JP) ................................. 2021-185083

(51) Int. Cl.
  *G02B 27/09*     (2006.01)
  *B60K 35/22*     (2024.01)
  *B60K 35/23*     (2024.01)
  *B60K 35/60*     (2024.01)
  *G02B 27/01*     (2006.01)
(52) U.S. Cl.
  CPC .......... *G02B 27/0955* (2013.01); *B60K 35/22* (2024.01); *B60K 35/23* (2024.01); *B60K 35/60* (2024.01); *G02B 27/0101* (2013.01)
(58) Field of Classification Search
  CPC ..................... G02B 27/0955; G02B 27/0101; B60K 35/23; B60K 35/60; B60K 35/22
  See application file for complete search history.

(56) References Cited

U.S. PATENT DOCUMENTS

2018/0259770 A1*    9/2018   Kuzuhara ............ G03B 21/142
2019/0310474 A1*   10/2019   Kobayashi ......... G02B 27/0101

FOREIGN PATENT DOCUMENTS

JP         2018092050 A      6/2018

OTHER PUBLICATIONS

International Preliminary Report of Patentability from International Application No. PCT/JP2022/031758 mailed May 2, 2024, 4 pages.
International Search Report from International Application No. PCT/JP2022/031758 mailed Nov. 1, 2022, 4 pages.

* cited by examiner

*Primary Examiner* — Nathanael R Briggs
(74) *Attorney, Agent, or Firm* — Shih IP Law Group, PLLC

(57)             ABSTRACT

A virtual image display device includes a display surface and a projection optical system that projects a light ray from the display surface toward a transparent member. The projection optical system includes a convex lens. An optical path of a first light ray, which is emitted from one point on the display surface and is reflected by the front surface of the transparent member coincides with an optical path of a second light ray, which is emitted from the one point and is reflected by the back surface of the transparent member, due to refraction in the convex lens. The center of the convex lens is displaced from a reference axis Z that passes through the one point and extends in a direction perpendicular to the display surface. The display surface is positioned closer to the convex lens than a focal point of the projection optical system.

10 Claims, 5 Drawing Sheets

VIRTUAL IMAGE DISPLAY DEVICE

CROSS REFERENCE TO RELATED APPLICATION

This application is a continuation of application No. PCT/JP2022/031758, filed on Aug. 23, 2022, and claims the benefit of priority from the prior Japanese Patent Application No. 2021-185082, filed on Nov. 12, 2021, and the prior Japanese Patent Application No. 2021-185083, filed on Nov. 12, 2021, the entire contents of which are incorporated herein by reference.

BACKGROUND

1. Technical Field

The present disclosure relates to a virtual image display device.

2. Description of the Related Art

As display devices for vehicles, head-up displays are sometimes used. A head-up display projects image display light onto the windshield of a vehicle, for example, and presents an image by superimposing a virtual image based on the image display light, on the scenery outside the vehicle. The windshield has a front surface and a back surface, and the image display light reflected by each of the front and back surfaces and visually recognized may be superimposed with positional displacement therebetween, which may result in a double image. In order to suppress the occurrence of such a double image, a configuration has been proposed in which the optical path of a first light ray reflected by the front surface and the optical path of a second light ray reflected by the back surface are made to coincide (see JP2018-92050A, for example).

In the abovementioned related art, the display unit needs to be disposed at a focal point of the optical system, which has been a restriction on the downsizing of the virtual image display device.

SUMMARY

The present disclosure has been made in view of the aforementioned circumstances, and a general purpose thereof is to provide a technology for downsizing a virtual image display device that suppresses the occurrence of a double image.

A virtual image display device according to one embodiment of the present disclosure includes a display surface on which an image is displayed, and a projection optical system that projects a light ray from the display surface toward a transparent member that has a front surface and a back surface and that reflects some of incident light rays. The projection optical system includes a convex lens disposed between the display surface and the transparent member. An optical path of a first light ray, which is emitted from one point on the display surface, penetrates the convex lens, and is reflected by the front surface of the transparent member, after the reflection by the front surface coincides with an optical path of a second light ray, which is emitted from the one point, penetrates the convex lens, is reflected by the back surface of the transparent member, and is emitted from the front surface of the transparent member, after the emission from the front surface, due to refraction in the convex lens. Within a plane that includes the first light ray and the second light ray, the center of the convex lens is displaced from a reference axis that passes through the one point and that extends in a direction perpendicular to the display surface. The display surface is positioned closer to the convex lens than a focal point of the projection optical system. With the transparent member, a virtual image of the image is presented.

A virtual image display device according to another embodiment of the present disclosure includes a display surface on which an image is displayed, and a projection optical system that projects a light ray from the display surface toward a transparent member that has a front surface and a back surface and that reflects some of incident light rays. The projection optical system includes a convex lens disposed between the display surface and the transparent member. An optical path of a first light ray, which is emitted from one point on the display surface, penetrates the convex lens, and is reflected by the front surface of the transparent member, after the reflection by the front surface coincides with an optical path of a second light ray, which is emitted from the one point, penetrates the convex lens, is reflected by the back surface of the transparent member, and is emitted from the front surface of the transparent member, after the emission from the front surface, due to refraction in the convex lens. Within a plane that includes the first light ray and the second light ray, the optical axis of the convex lens is tilted with respect to a reference axis that passes through the one point and that extends in a direction perpendicular to the display surface. The display surface is positioned between the center of the convex lens and a focal point of the convex lens. With the transparent member, a virtual image of the image is presented.

Optional combinations of the aforementioned constituting elements, and implementation of the present disclosure, including the constituting elements and expressions, in the form of methods, apparatuses, or systems may also be practiced as additional modes of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

In the following, an embodiment of the present disclosure will be described with reference to the drawings. Specific numerical values or the like are shown in the embodiment by way of example only to facilitate the understanding of the invention and should not be construed as limiting the present disclosure, unless otherwise specified. In the specification and drawings, elements with substantially identical functions and structures are denoted by the same reference symbol so that repetitive description can be omitted. Also, elements not directly relevant to the present disclosure are omitted from the illustration.

Figure 1:
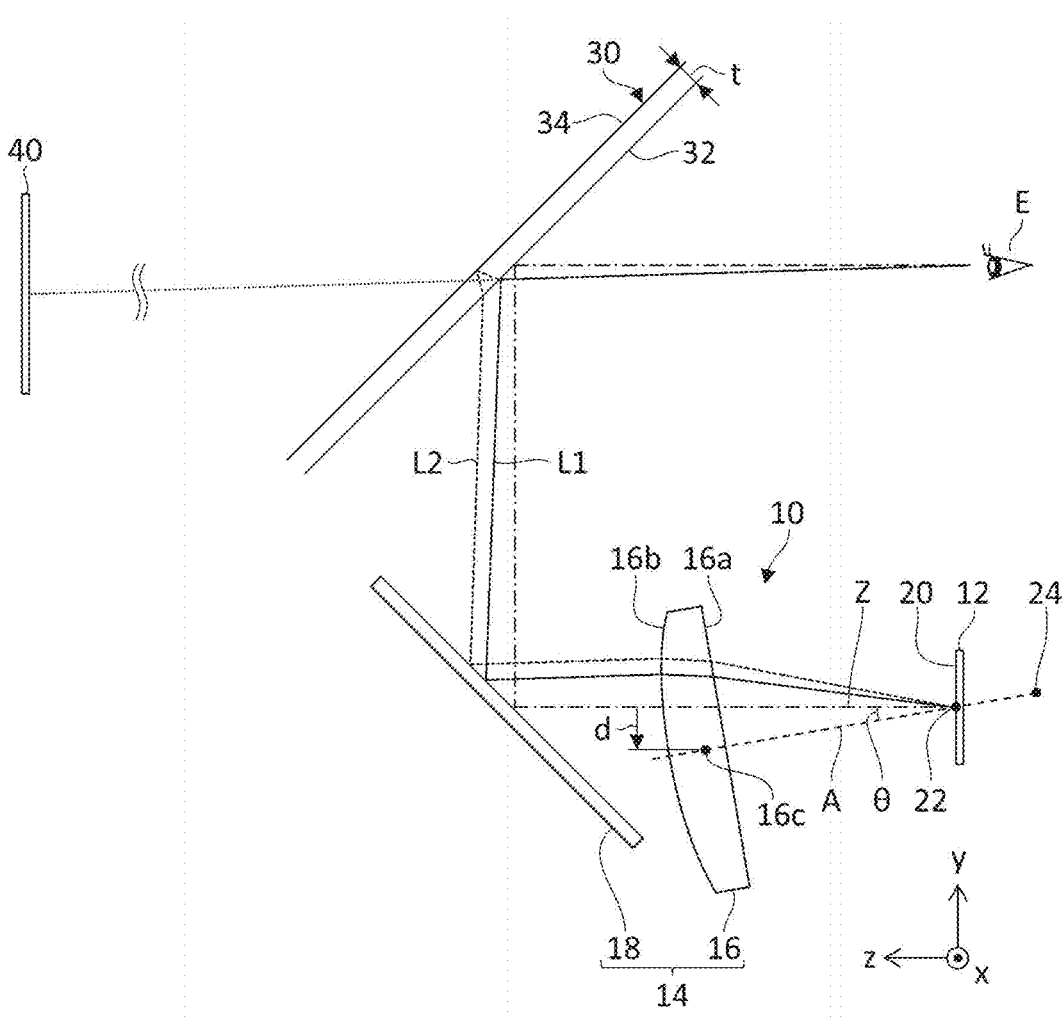
FIG. 1 schematically illustrates a configuration of a virtual image display device according to an embodiment.

FIG. 1 schematically illustrates a configuration of a virtual image display device 10 according to the embodiment. The virtual image display device 10 is a so-called head-up display device. The virtual image display device 10 projects the light rays from a display surface 20 onto a transparent member 30 to present a virtual image 40 in front of a user E. The virtual image display device 10 includes a display unit 12 and a projection optical system 14.

The display unit 12 includes the display surface 20 on which an image is displayed. The display unit 12 is an image display element, such as a liquid crystal display (LCD) and an organic electro luminescence display (OELD). For example, the display unit 12 acquires an image signal and displays an image corresponding to the image signal on the display surface 20 to generate image display light. The display surface 20 may be a screen onto which an image is projected by a projector.

The projection optical system 14 projects the image display light generated on the display surface 20 toward the transparent member 30. The projection optical system 14 includes a convex lens 16 and a projection mirror 18. The convex lens 16 is disposed on the optical path from the display surface 20 to the transparent member 30. The projection mirror 18 is disposed on the optical path from the convex lens 16 to the transparent member 30. The projection mirror 18 is a flat mirror and turns the light rays from the convex lens 16 toward the transparent member 30. The projection optical system 14 may not necessarily include the projection mirror 18 and may be configured such that the optical path is not turned by the projection mirror 18. Also, the projection optical system 14 may further include, besides the projection mirror 18, an additional flat mirror to turn the optical path.

The convex lens 16 is a lens having positive refractive power. The convex lens 16 is, for example, a plano-convex lens having a first surface 16a, which is planar, and a second surface 16b, which is convex. The convex lens 16 is disposed such that the first surface 16a faces the display surface 20 side and the second surface 16b faces the projection mirror 18 (or transparent member 30) side. The convex lens 16 may also be a biconvex lens in which both the first surface 16a and the second surface 16b are convex. The convex lens 16 may also be a convex meniscus lens in which the first surface 16a is concave and the second surface 16b is convex. The convex lens 16 is, for example, a spherical lens in which the convex surface (or concave surface) is spherical. The convex lens 16 may also be an aspherical lens in which the convex surface (or concave surface) is a free-form surface.

The transparent member 30 is a member that reflects some of incident light rays and transmits the rest. The transparent member 30 reflects the image display light toward the user E, thereby presenting to the user E the virtual image 40 corresponding to the image displayed on the display surface 20. The transparent member 30 is, for example, a windshield installed in a vehicle. The transparent member 30 may be a combiner included in the virtual image display device 10. The transparent member 30 is configured such that a front surface 32 and a back surface 34 thereof are parallel and the thickness t between the front surface 32 and the back surface 34 is uniform. The transparent member 30 is constituted by, for example, a glass or resin plate of planar or curved shape. The transparent member 30 is different from wedge-shaped glass of which the front surface 32 and the back surface 34 are not parallel.

The image display light incident on the transparent member 30 includes a first light ray L1 that is reflected by the front surface 32 of the transparent member 30 and directed toward the user E, and a second light ray L2 that is reflected by the back surface 34 of the transparent member 30 and directed toward the user E. The first light ray L1 is emitted from an arbitrary point of the display surface 20, penetrates the convex lens 16, is reflected by the projection mirror 18, and then is reflected by the front surface 32 of the transparent member 30 to be directed toward the user E. The second light ray L2 is emitted from an arbitrary point of the display surface 20, penetrates the convex lens 16, is reflected by the projection mirror 18, penetrates the front surface 32 of the transparent member 30, is reflected by the back surface 34 of the transparent member 30, and then is emitted from the front surface 32 of the transparent member 30 to be directed toward the user E. When the first light ray L1 and the second light ray L2 toward the user E coincide, the user E can visually recognize the virtual image 40 without a double image caused by positional displacement between the first light ray L1 and the second light ray L2.

When the front surface 32 and the back surface 34 of the transparent member 30 are parallel and if the first light ray L1 and the second light ray L2 incident on the transparent member 30 are also parallel, the directions (angles) of the first light ray L1 and the second light ray L2 directed toward the user E will coincide. In other words, the optical path of the first light ray L1 after the reflection by the front surface 32 of the transparent member 30 coincides with the optical path of the second light ray L2 after the emission from the front surface 32 of the transparent member 30. The "coinciding" as used herein may preferably be perfect coincidence but is not limited thereto, and a slight error with which the user E cannot perceive a double image may be included. Similarly, the "parallel" as used herein may preferably be perfectly parallel but is not limited thereto, and a slight error with which the user E cannot perceive a double image may be included.

In the present embodiment, the device is configured such that the optical path, after the reflection by the front surface 32, of the first light ray L1 emitted from a point as reference (also referred to as a reference point 22) on the display surface 20 toward the user E coincides with the optical path, after the emission from the front surface 32, of the second light ray L2 emitted from the reference point 22 toward the user E. In the present embodiment, the device is configured such that the optical paths of the first light ray L1 and the second light ray L2 toward the user E coincide, particularly by means of refraction in the convex lens 16, so as not to allow the user E to perceive a double image.

Furthermore, in the present embodiment, the display surface 20 is disposed closer to the convex lens 16 than a focal point 24 of the projection optical system 14. In other words, the display surface 20 is positioned between the center 16c of the convex lens 16 and a focal point (the front focal point) of the convex lens 16. As a result, compared to the case where the display surface 20 is disposed at the focal point 24 of the projection optical system 14, the distance from the projection optical system 14 (or the convex lens 16) to the display surface 20 can be shortened, so that the virtual image display device 10 can be downsized.

In the following, such a positional relationship between the projection optical system 14 and the display surface 20 will be described based on the arrangement of the display surface 20. In specific, in FIG. 1, a direction perpendicular to the display surface 20 is defined as a z direction, a direction perpendicular to a plane including the first light ray L1 and the second light ray L2 is defined as an x direction, and a direction perpendicular to the x direction and the z direction is defined as a y direction. FIG. 1 shows a y-z plane that includes the first light ray L1 and the second light ray L2. Also, an axis extending from the reference point 22 in a z direction will be referred to as a reference axis Z. The position of the reference point 22 on the display surface 20 is not particularly limited, but, for example, the vicinity of the middle in a y direction of the display surface 20 may be set as the reference point 22. In the configuration of FIG. 1, the focal point 24 of the projection optical system 14 coincides with the front focal point of the convex lens 16.

The convex lens 16 is disposed eccentrically with respect to the reference axis Z, in order to intentionally cause aberrations due to eccentricity. In specific, in order to cause an off-axis aberration due to decentering, the convex lens 16 is disposed with the center 16c thereof displaced in a y direction from the reference axis Z. An eccentricity d of the convex lens 16 is the distance in the y direction from the reference axis Z to the center 16c of the convex lens 16. Also, in order to cause an eccentric aberration due to tilting, the convex lens 16 is disposed with an optical axis A thereof tilted in a y direction with respect to the reference axis Z. A tilt angle θ of the convex lens 16 is the angle between the reference axis Z and the optical axis A of the convex lens 16.

In the present embodiment, since the convex lens 16 is eccentric due to decentering, the first light ray L1 and the second light ray L2 penetrate the convex lens 16 at a position away from the center 16c of the convex lens 16. As a result, due to the influence of the off-axis aberration, the reference point 22, which is an intersection of the first light ray L1 and the second light ray L2, is positioned closer to the convex lens 16 than the focal point 24 of the projection optical system 14. Also, since the convex lens 16 is eccentric due to tilting, the reference point 22 as an intersection of the first light ray L1 and the second light ray L2 is positioned closer to the convex lens 16 than the focal point 24 of the projection optical system 14. Thus, by combining the eccentricity due to decentering and the eccentricity due to tilting, the display surface 20 can be disposed at a position closer to the convex lens 16 than the focal point 24 of the projection optical system 14, so that the virtual image display device 10 can be downsized.

The eccentricity d and the tilt angle θ of the convex lens 16 can be set appropriately based on the specifications of the entire optical system related to the virtual image display device 10.

The eccentricity d of the convex lens 16 may preferably be 2% or greater and 15% or less of the focal length of the projection optical system 14 (or convex lens 16). When the eccentricity d is less than 2% of the focal length, it is difficult to obtain the effect of downsizing enabled by the eccentricity due to decentering. Also, when the eccentricity d is greater than 15% of the focal length, image distortion due to the off-axis aberration increases, so that it is difficult to present the virtual image 40 with appropriate image quality to the user E. The eccentricity d of the convex lens 16 may be, for example, 5% or greater of the focal length of the projection optical system 14 (or convex lens 16), or 10% or less of the focal length of the projection optical system 14 (or convex lens 16).

The tilt angle θ of the convex lens 16 may preferably be 3.5 degrees or greater and 45 degrees or smaller. When the tilt angle θ is smaller than 3.5 degrees, it is difficult to obtain the effect of downsizing enabled by the eccentricity due to tilting. Also, when the tilt angle θ is greater than 45 degrees, image distortion due to eccentric distortion increases, so that it is difficult to present the virtual image 40 with appropriate image quality to the user E. The tilt angle θ of the convex lens 16 may be 5 degrees or greater, or 30 degrees or smaller.

In the present embodiment, the direction of the eccentricity due to decentering of the convex lens 16 is preferably the same as the direction of the eccentricity due to tilting of the convex lens 16. For example, as shown in FIG. 1, when the direction of the eccentricity due to decentering of the convex lens 16 is set to the −y direction, it is preferable to also set the direction of the eccentricity due to tilting of the convex lens 16 to the −y direction. By making the decentering direction and the tilting direction of the convex lens 16 the same, the effects of the eccentricity due to decentering and the eccentricity due to tilting can be added together, so that the distance from the projection optical system 14 (or the convex lens 16) to the display surface 20 can be further shortened.

In the present embodiment, the intersection of the optical axis A of the convex lens 16 and the reference axis Z is positioned on the display surface 20. By positioning the intersection of the optical axis A of the convex lens 16 and the reference axis Z on the display surface 20, the effects of the eccentricity due to decentering and the eccentricity due to tilting can be balanced, preventing either of the effects becoming too large. As a result, the effect of downsizing can be further enhanced while suppressing the deterioration of the image quality of the virtual image 40.

First Modification

Figure 2:
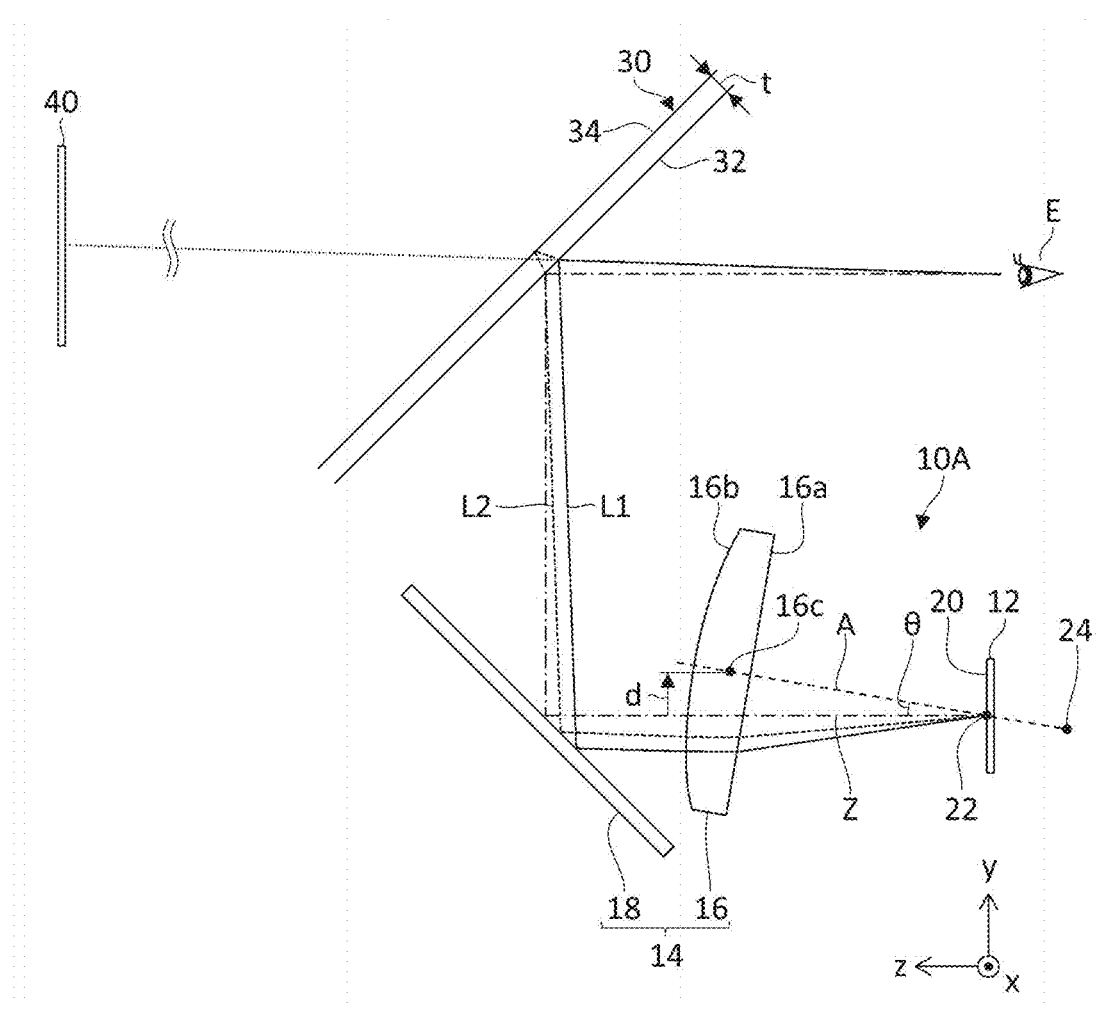
FIG. 2 schematically illustrates a configuration of a virtual image display device according to a first modification.

FIG. 2 schematically illustrates a configuration of a virtual image display device 10A according to a first modification. In the first modification, the directions of the eccentricity due to decentering and the eccentricity due to tilting of the convex lens 16 are opposite to those in the aforementioned embodiment. In specific, in the first modification, the direction of the eccentricity due to decentering of the convex lens 16 is the +y direction, and the direction of the eccentricity due to tilting of the convex lens 16 is the +y direction. The other configurations in the first modification may be the same as those in the aforementioned embodiment. The first modification can also provide effects similar to those in the aforementioned embodiment.

Second Modification

Figure 3:
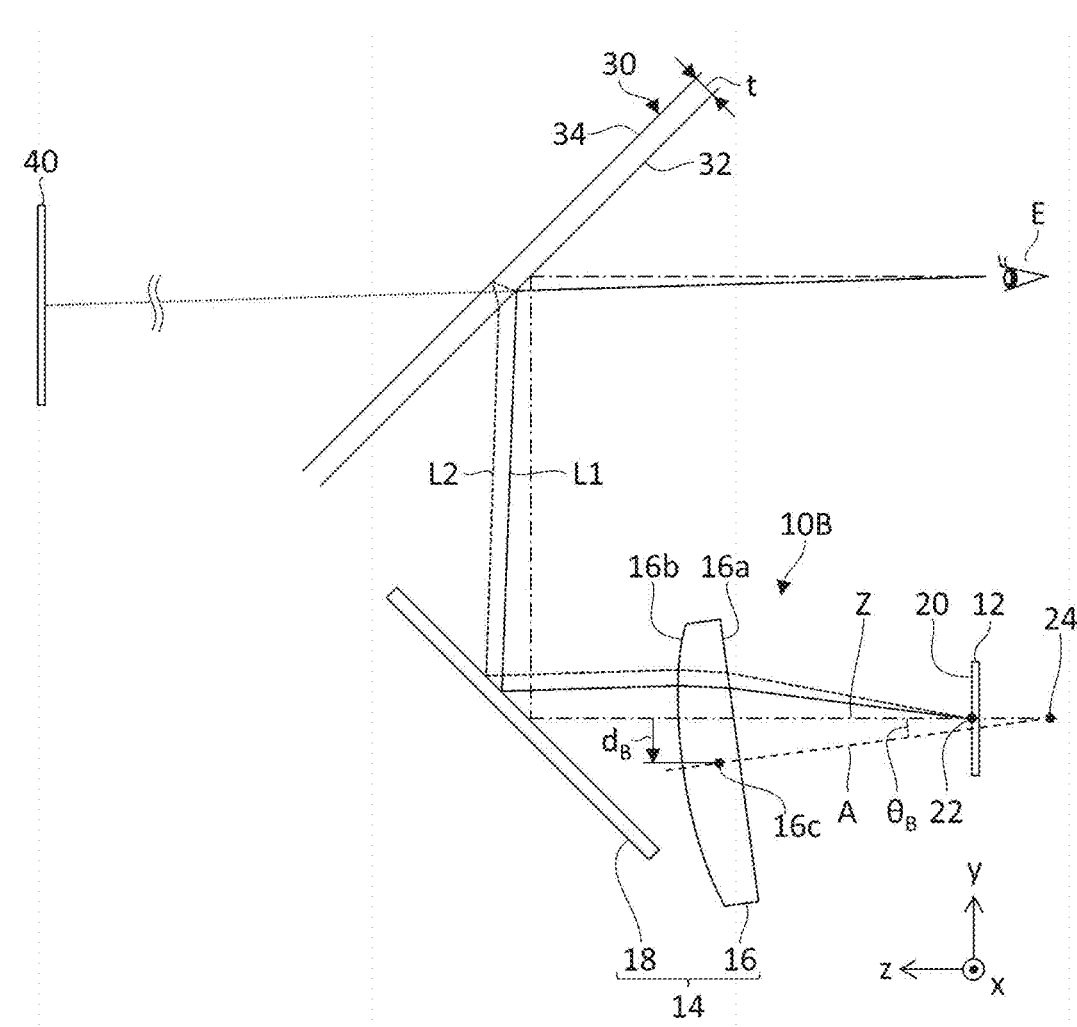
FIG. 3 schematically illustrates a configuration of a virtual image display device according to a second modification.

FIG. 3 schematically illustrates a configuration of a virtual image display device 10B according to a second modification. In the second modification, the intersection of the optical axis A of the convex lens 16 and the reference axis Z is positioned farther from the convex lens 16 than the display surface 20. In the example of FIG. 3, the intersection of the optical axis A of the convex lens 16 and the reference axis Z coincides with the focal point 24 of the projection optical system 14. The other configurations in the second modification may be the same as those in the aforementioned embodiment. The second modification can also provide effects similar to those in the aforementioned embodiment.

In the second modification, the eccentricity $d_B$ and the tilt angle $θ_B$ of the convex lens 16 may respectively be the same as the eccentricity d and the tilt angle θ of the convex lens 16 in the aforementioned embodiment or different therefrom. For example, the eccentricity $d_B$ of the convex lens 16 in the second modification may be larger than the eccentricity d of the convex lens 16 in the embodiment. Also, the tilt angle $\theta_B$ of the convex lens 16 in the second modification may be smaller than the tilt angle $\theta$ of the convex lens 16 in the embodiment. In the second modification, design is conceivable in which, for example, the eccentricity due to decentering is made relatively large and the eccentricity due to tilting is made relatively small so as to balance the effects of both.

In the second modification, the intersection of the optical axis A of the convex lens 16 and the reference axis Z may be positioned between the display surface 20 and the focal point 24 of the projection optical system 14. Also, in the second modification, the intersection of the optical axis A of the convex lens 16 and the reference axis Z may be positioned farther from the convex lens 16 than the focal point 24 of the projection optical system 14. Also, in the second modification, each of the directions of the eccentricity due to decentering and the eccentricity due to tilting of the convex lens 16 may be the −y direction as in the embodiment or may be the +y direction as in the first modification.

Third Modification

Figure 4:
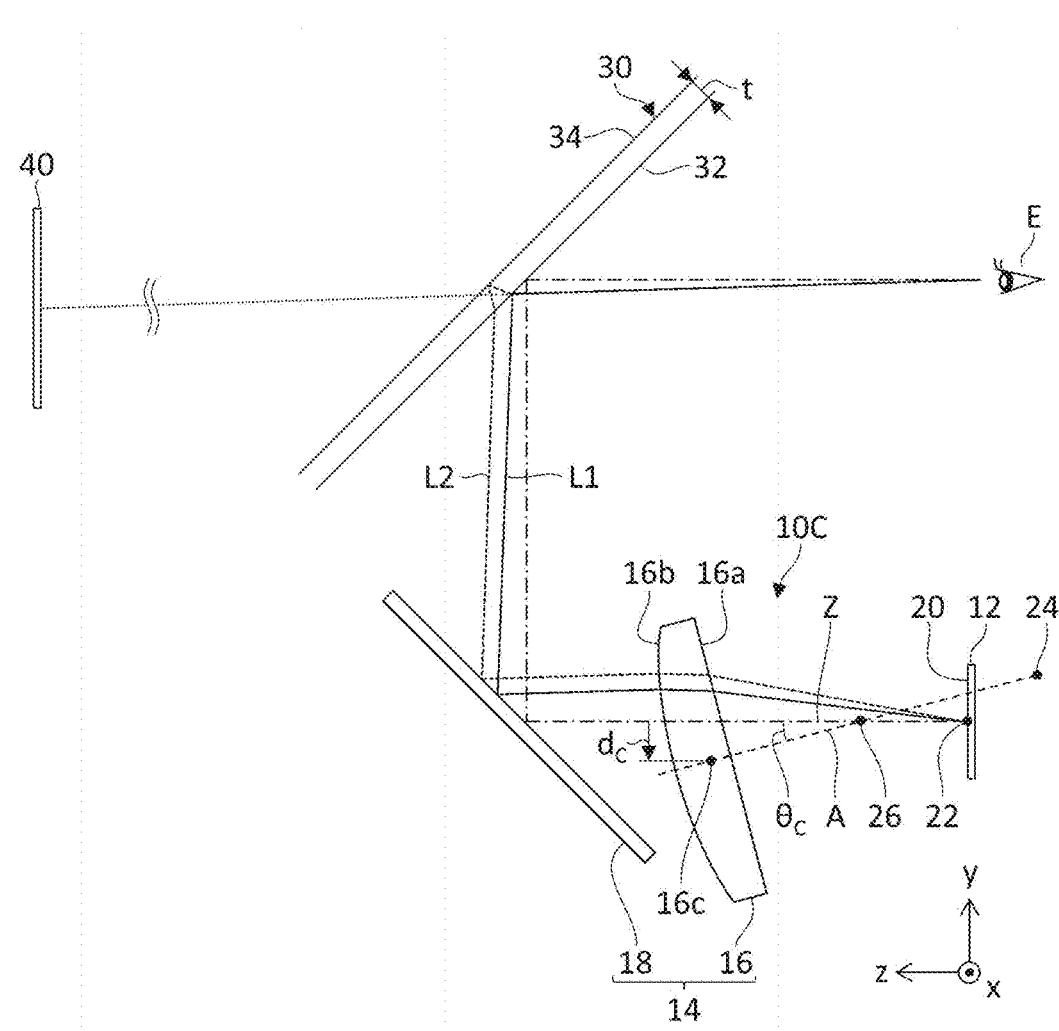
FIG. 4 schematically illustrates a configuration of a virtual image display device according to a third modification.

FIG. 4 schematically illustrates a configuration of a virtual image display device 10C according to a third modification. In the third modification, an intersection 26 of the optical axis A of the convex lens 16 and the reference axis Z is positioned closer from the convex lens 16 than the display surface 20. In the example of FIG. 4, the intersection 26 of the optical axis A of the convex lens 16 and the reference axis Z is positioned around the middle between the center 16c of the convex lens 16 and the focal point 24 of the projection optical system 14. The other configurations in the third modification may be the same as those in the aforementioned embodiment. The third modification can also provide effects similar to those in the aforementioned embodiment.

In the third modification, the eccentricity $d_C$ and the tilt angle $\theta_C$ of the convex lens 16 may respectively be the same as the eccentricity d and the tilt angle $\theta$ of the convex lens 16 in the embodiment or different therefrom. For example, the eccentricity $d_C$ of the convex lens 16 in the third modification may be smaller than the eccentricity d of the convex lens 16 in the embodiment. Also, the tilt angle $\theta_C$ of the convex lens 16 in the third modification may be larger than the tilt angle $\theta$ of the convex lens 16 in the embodiment. In the third modification, design is conceivable in which, for example, the eccentricity due to decentering is made relatively small and the eccentricity due to tilting is made relatively large so as to balance the effects of both.

In the third modification, the intersection 26 of the optical axis A of the convex lens 16 and the reference axis Z may be positioned closer to the display surface 20 than to the convex lens 16, may be positioned in the middle between convex lens 16 and the display surface 20, or may be positioned closer to the convex lens 16 than to the display surface 20. Also, in the third modification, each of the directions of the eccentricity due to decentering and the eccentricity due to tilting of the convex lens 16 may be the −y direction as in the embodiment or may be the +y direction as in the first modification.

Fourth Modification

Figure 5:
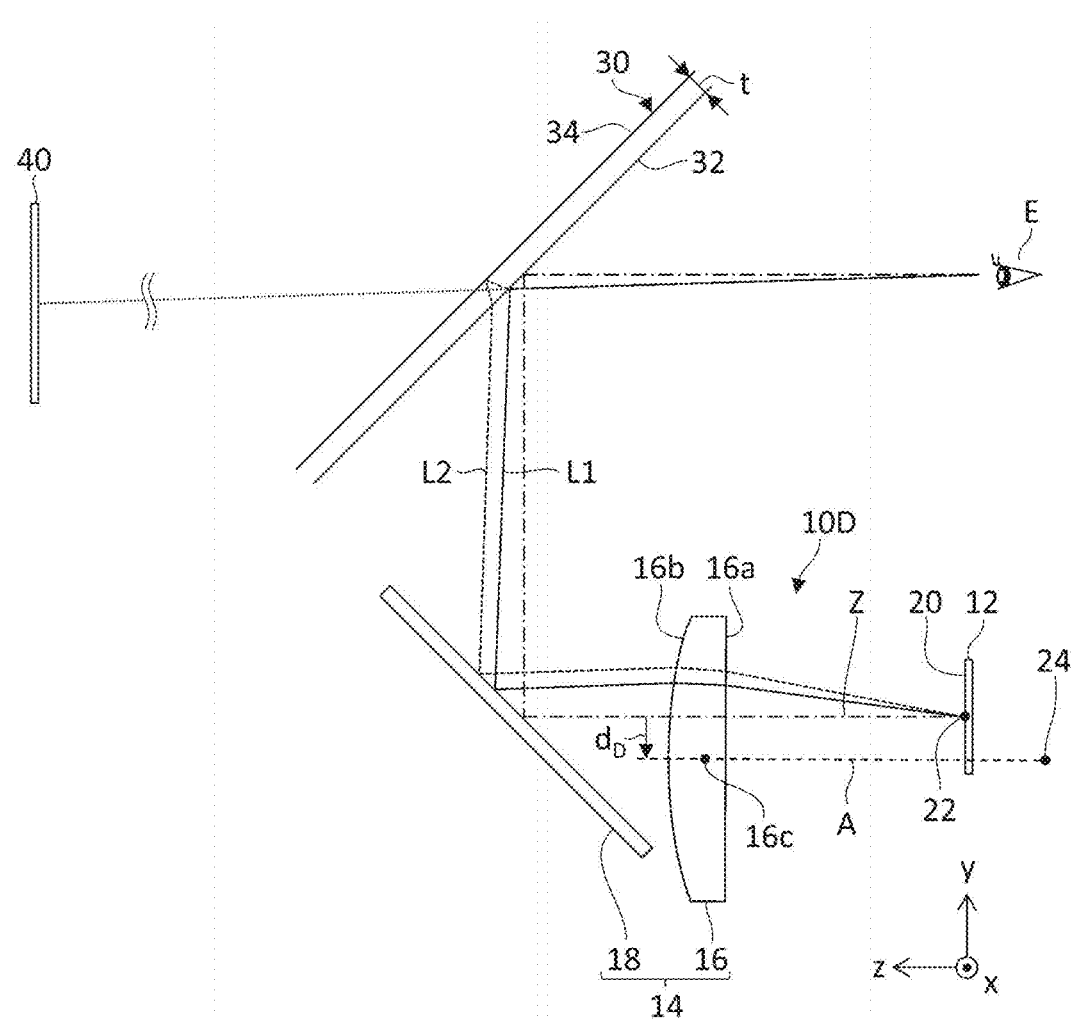
FIG. 5 schematically illustrates a configuration of a virtual image display device according to a fourth modification.

FIG. 5 schematically illustrates a configuration of a virtual image display device 10D according to a fourth modification. In the fourth modification, the optical axis A of the convex lens 16 is not tilted with respect to the reference axis Z and is parallel to the reference axis Z. The fourth modification can also provide effects similar to those in the aforementioned embodiment.

In the fourth modification, the eccentricity $d_D$ of the convex lens 16 may be the same as the eccentricity d of the convex lens 16 in the embodiment or may be different therefrom. For example, the eccentricity $d_D$ of the convex lens 16 in the fourth modification may be larger than the eccentricity d of the convex lens 16 in the embodiment. In the fourth modification, since there is no effect provided by the eccentricity due to tilting, the effect of downsizing equivalent to that in the embodiment can be achieved by relatively increasing the eccentricity due to decentering. Also, in the fourth modification, the direction of the eccentricity due to decentering of the convex lens 16 may be the −y direction as in the aforementioned embodiment or may be the +y direction as in the first modification.

The present disclosure has been described with reference to the aforementioned embodiment. However, the present disclosure is not limited thereto and also includes a form resulting from appropriate combination or replacement of the configurations shown in the respective display examples.

In the following, some aspects of the present disclosure will be described.

A first aspect of the present disclosure is a virtual image display device that includes a display surface on which an image is displayed, and a projection optical system that projects a light ray from the display surface toward a transparent member that has a front surface and a back surface and that reflects some of incident light rays. The projection optical system includes a convex lens disposed between the display surface and the transparent member. An optical path of a first light ray, which is emitted from one point on the display surface, penetrates the convex lens, and is reflected by the front surface of the transparent member, after the reflection by the front surface coincides with an optical path of a second light ray, which is emitted from the one point, penetrates the convex lens, is reflected by the back surface of the transparent member, and is emitted from the front surface of the transparent member, after the emission from the front surface, due to refraction in the convex lens. Within a plane that includes the first light ray and the second light ray, the center of the convex lens is displaced from a reference axis that passes through the one point and that extends in a direction perpendicular to the display surface. The display surface is positioned closer to the convex lens than a focal point of the projection optical system. With the transparent member, a virtual image of the image is presented.

In the first aspect, the distance from the reference axis to the center of the convex lens may be 2% or greater and 15% or less of a focal length of the projection optical system. Also, the distance from the reference axis to the center of the convex lens may be 5% or greater of a focal length of the projection optical system. Also, the distance from the reference axis to the center of the convex lens may be 10% or less of a focal length of the projection optical system.

In the first aspect, within a plane that includes the first light ray and the second light ray, the optical axis of the convex lens may be parallel to the reference axis.

In the first aspect, within a plane that includes the first light ray and the second light ray, the optical axis of the convex lens may be tilted with respect to the reference axis. The tilt angle of the optical axis of the convex lens with respect to the reference axis may be 3.5 degrees or greater and 45 degrees or smaller. Also, the tilt angle of the optical axis of the convex lens with respect to the reference axis may be 5 degrees or greater. Also, the tilt angle of the optical axis of the convex lens with respect to the reference axis may be 30 degrees or smaller.

A second aspect of the present disclosure is a virtual image display device that includes a display surface on which an image is displayed, and a projection optical system that projects a light ray from the display surface toward a transparent member that has a front surface and a back surface and that reflects some of incident light rays. The projection optical system includes a convex lens disposed between the display surface and the transparent member. An optical path of a first light ray, which is emitted from one point on the display surface, penetrates the convex lens, and is reflected by the front surface of the transparent member, after the reflection by the front surface coincides with an optical path of a second light ray, which is emitted from the one point, penetrates the convex lens, is reflected by the back surface of the transparent member, and is emitted from the front surface of the transparent member, after the emission from the front surface, due to refraction in the convex lens. Within a plane that includes the first light ray and the second light ray, the optical axis of the convex lens is tilted with respect to a reference axis that passes through the one point and that extends in a direction perpendicular to the display surface. The display surface is positioned between the center of the convex lens and a focal point of the convex lens. With the transparent member, a virtual image of the image is presented.

In the second aspect, the tilt angle of the optical axis of the convex lens with respect to the reference axis may be 3.5 degrees or greater and 45 degrees or smaller. Also, the tilt angle of the optical axis of the convex lens with respect to the reference axis may be 5 degrees or greater. Also, the tilt angle of the optical axis of the convex lens with respect to the reference axis may be 30 degrees or smaller.

In the second aspect, within a plane that includes the first light ray and the second light ray, an intersection of the optical axis of the convex lens and the reference axis may be positioned on the display surface. Also, within a plane that includes the first light ray and the second light ray, an intersection of the optical axis of the convex lens and the reference axis may be positioned farther from the convex lens than the display surface. Also, within a plane that includes the first light ray and the second light ray, an intersection of the optical axis of the convex lens and the reference axis may be positioned closer from the convex lens than the display surface.

In the first or second aspect, the first light ray and the second light ray may penetrate the convex lens at a position away from the center of the convex lens. The first light ray and the second light ray from the convex lens may be tilted with respect to the optical axis of the convex lens. The first light ray incident on the transparent member may be parallel to the second light ray incident on the transparent member. The thickness between the front surface and the back surface of the transparent member may be uniform.

What is claimed is:

1. A virtual image display device, comprising:
a display surface on which an image is displayed; and
a projection optical system that projects a light ray from the display surface toward a transparent member that has a front surface and a back surface and that reflects some of incident light rays,
wherein the projection optical system includes a convex lens disposed between the display surface and the transparent member,
wherein an optical path of a first light ray, which is emitted from one point on the display surface, penetrates the convex lens, and is reflected by the front surface of the transparent member, after the reflection by the front surface coincides with an optical path of a second light ray, which is emitted from the one point, penetrates the convex lens, is reflected by the back surface of the transparent member, and is emitted from the front surface of the transparent member, after the emission from the front surface, due to refraction in the convex lens,
wherein, within a plane that includes the first light ray and the second light ray, the center of the convex lens is displaced from a reference axis that passes through the one point and that extends in a direction perpendicular to the display surface,
wherein the display surface is positioned closer to the convex lens than a focal point of the projection optical system, and
wherein, with the transparent member, a virtual image of the image is presented.

2. The virtual image display device according to claim 1, wherein the distance from the reference axis to the center of the convex lens is 2% or greater and 15% or less of a focal length of the projection optical system.

3. The virtual image display device according to claim 1, wherein, within a plane that includes the first light ray and the second light ray, the optical axis of the convex lens is parallel to the reference axis.

4. The virtual image display device according to claim 1, wherein, within a plane that includes the first light ray and the second light ray, the optical axis of the convex lens is tilted with respect to the reference axis.

5. The virtual image display device according to claim 4, wherein the tilt angle of the optical axis of the convex lens with respect to the reference axis is 3.5 degrees or greater and 45 degrees or smaller.

6. A virtual image display device, comprising:
a display surface on which an image is displayed; and
a projection optical system that projects a light ray from the display surface toward a transparent member that has a front surface and a back surface and that reflects some of incident light rays,
wherein the projection optical system includes a convex lens disposed between the display surface and the transparent member,
wherein an optical path of a first light ray, which is emitted from one point on the display surface, penetrates the convex lens, and is reflected by the front surface of the transparent member, after the reflection by the front surface coincides with an optical path of a second light ray, which is emitted from the one point, penetrates the convex lens, is reflected by the back surface of the transparent member, and is emitted from the front surface of the transparent member, after the emission from the front surface, due to refraction in the convex lens,
wherein, within a plane that includes the first light ray and the second light ray, the optical axis of the convex lens is tilted with respect to a reference axis that passes through the one point and that extends in a direction perpendicular to the display surface,
wherein the display surface is positioned between the center of the convex lens and a focal point of the convex lens, and
wherein, with the transparent member, a virtual image of the image is presented.

7. The virtual image display device according to claim 6, wherein the tilt angle of the optical axis of the convex lens with respect to the reference axis is 3.5 degrees or greater and 45 degrees or smaller.

8. The virtual image display device according to claim 6, wherein, within a plane that includes the first light ray and the second light ray, an intersection of the optical axis of the convex lens and the reference axis is positioned on the display surface.

9. The virtual image display device according to claim 6, wherein, within a plane that includes the first light ray and the second light ray, an intersection of the optical axis of the convex lens and the reference axis is positioned farther from the convex lens than the display surface.

10. The virtual image display device according to claim 6, wherein, within a plane that includes the first light ray and the second light ray, an intersection of the optical axis of the convex lens and the reference axis is positioned closer from the convex lens than the display surface.

\* \* \* \* \*